United States Patent [19]

Amirav et al.

[11] Patent Number: 4,845,367

[45] Date of Patent: Jul. 4, 1989

[54] METHOD AND APPARATUS FOR PRODUCING IONS BY SURFACE IONIZATION OF ENERGY-RICH MOLECULES AND ATOMS

[75] Inventors: Aviv Amirav, Ramat Hasharon; Albert Danon, Petah Tikva, both of Israel

[73] Assignee: Ramot University Authority for Applied Research & Industrial Development Ltd., Tel Aviv, Israel

[21] Appl. No.: 141,866

[22] Filed: Jan. 11, 1988

[30] Foreign Application Priority Data

Jan. 23, 1987 [IL] Israel ........................................ 81375

[51] Int. Cl.[4] ............................................ B01D 59/44

[52] U.S. Cl. ................................ 250/423 R; 250/424; 250/251; 250/281

[58] Field of Search .................... 250/423 R, 283, 423, 250/424, 423 P, 251; 315/111.81; 313/359

[56] References Cited

U.S. PATENT DOCUMENTS

| | | | |
|---|---|---|---|
| 4,442,354 | 4/1984 | Hurst et al. | 250/423 P |
| 4,755,344 | 7/1988 | Friedman et al. | 313/359.1 |

FOREIGN PATENT DOCUMENTS

| | | | |
|---|---|---|---|
| 3278772 | 12/1966 | Japan | 250/423 |
| 0239186 | 10/1986 | Japan | 250/423 R |
| 8302572 | 8/1983 | World Int. Prop. O. | 250/283 |

OTHER PUBLICATIONS

B. Rasser et al., Surface Ionization Source for Heavy Ions, 1/2/80.

*Primary Examiner*—Janice A. Howell
*Assistant Examiner*—Michael Aronoff
*Attorney, Agent, or Firm*—Benjamin J. Barish

[57] ABSTRACT

A method and apparatus for producing ions by surface ionization by increasing the molecular energy of the substance to be ionized to the hyperthermal energy range, and directing a beam of the substance to impinge against a solid surface disposed in a vacuum chamber. The solid surface is one e.g., clean diamond or dirty molybdenum, which is capable of inducing from the substance, e.g., an organic halide, molecular ionization or dissociative ionization of the substance, and one which does not react with the molecules or tend to neutralize the produced ions. The molecular energy includes kinetic energy gained in aerodynamic acceleration by seeding a light gas, e.g., hydrogen or helium, with molecules of the substance to be ionized, thereby producing a hyperthermal beam of 0.5–20 electron volts of the substance to be ionized.

29 Claims, 3 Drawing Sheets

METHOD AND APPARATUS FOR PRODUCING IONS BY SURFACE IONIZATION OF ENERGY-RICH MOLECULES AND ATOMS

BACKGROUND OF THE INVENTION

The present invention relates to a method and apparatus for producing ions by surface ionization of energy-rich molecules and atoms.

Surface ionization is widely used in ion sources of various types, from miniature surfaces for the purpose of mass-spectrometric and analytic applications, to powerful sources of industrial installations for isotope separation and also for jet propulsion. The conventional technique for surface ionization presently used is to heat a metal surface, such as a metal wire, in order to volatilize the ions and to gain the metal surface work function.

BRIEF SUMMARY OF THE INVENTION

An object of the present invention is provide a new method and apparatus for producing ions by surface ionization of energy-rich molecules and atoms, which method and apparatus provide advantages over the conventional technique in a number of respects as will be described more particularly below.

According to the present invention, there is provided a method of producing ions by surface ionization of a substance, comprising: increasing the molecular energy of the substance to be ionized to the hyperthermal energy range; and directing a beam of said substance to impinge against a solid surface of a material which is capable of inducing ionization of said substance to produce ions, and which does not react with the molecules or tend to neutralize the produced ions.

The substance to be ionized may be one in which either molecular ionization or dissociative ionization is induced when a beam of the substance is directed to impinge against the solid surface.

The novel method is based on the discovery that stable molecules undergo molecular ionization and dissociative ionization induced by a collision with a surface at hyperthermal energies. The term "hyperthermal energy range" means larger than the "thermal range", that is, larger than the product of "k" (Boltzmann constant) and "T" (degrees in Kelvin) of the molecular sample, or its container, normally used to define this "thermal energy".

The solid surface impinged by the beam should be one capable of giving or taking an electron from the surface (molecular ionization), or capable of inducing fragmentation into pairs of negative and positive ions (molecular disassociation). The solid surface should also be one which is chemically inert with respect to the molecules of the beam, and one which does no tend to neutralize the produced ions, so that the ions that are formed will leave the surface as ions and will not be absorbed. A preferred example of such a solid surface, as described below is clean diamond.

The hyperthermal energy can be generated in a number of ways. In the described preferred embodiment, it is generated by increasing the velocity of the beam to the hyperthermal energy range before impingement against the solid surface. It is believed apparent, however, that it can also be generated by plasma heating of neutral molecules, or by laser heating, or by a combination of any of the foregoing.

In same cases, it may be preferred to have the increased energy in the form of electronic, vibrational and kinetic energy produced by the combination of aerodynamic acceleration and plasma heating.

Theoretically, any gas can be used as the carrier gas, but the lightest gases are preferred because they produce the highest kinetic energy. Preferably, therefore, the gas is either hydrogen, the lightest gas, or helium, which although the second lightest gas provides the additional advantage of being less reactive than hydrogen.

Theoretically, almost any molecule or atom can be used for producing positive ions, and almost any molecule, atom, or molecule with a fragment having a high electron affinity can be used for producing negative ions. Halides generally have high electron affinity and therefore are particularly useful for producing negative ions: examples which have been found operative are the alkyl halides, such as propyl iodide, ethyl iodide, and butyl iodide, and hexafluorobenzene. For producing positive ions, there may be used anthracene benzylbromide, and DABCO $C_4H_4N_2$. Further examples include trinitrotoluene (TNT) enabling the technique to be used for detecting explosives, and N,N dimethylaniline enabling the technique to be used for detecting the presence of organic bases, e.g., drugs.

The substance to be ionized may be a gas, liquid or solid under ambient conditions. If it is a liquid or a solid under ambient conditions, then heating is necessary in order to seed it into the carrier gas. The solid surface against which the beam is impinged may also be heated to enhance the yield.

When using supersonic jets, it is preferred to have the seeded molecules constitute from 0.1 to 5 percent by partial pressure of the contents of the gas. The lighter the molecule, the higher can be the concentration. Accordingly, for heavy molecules it is preferred to use a concentration of 0.1 to 1 percent; and for light molecules it is preferred to use a concentration of 0.1 to 5 percent.

The invention also provides apparatus for producing ions by surface ionization of energy-rich molecules and atoms in accordance with the above technique.

The above technique can serve as a new type of ion source having several important advantages, including the following:

(a) Unlike the conventional technique for surface ionization, the new method can be used for producing a large variety of both positive and negative ions; in fact, it appears to have the potential of being the most efficient negative ion source, as well as an efficient positive ion source.

(b) The ion source can produce a mixture of both positive and negative ions for plasma.

(c) Heating the solid surface is not essential; accordingly, considerable energy is saved, and moreover, the responsive time is very short, in the microsecond time scale. (While heating the solid surface is not essential, it may nevertheless be desirable in order to enhance the yield.)

(d) The molecular ionization is unaffected by the presence of strong magnetic and/or electric fields.

(e) The obtained mass spectrum is simple and easy to interpret as it contains molecular ion or a characteristic fragment.

(f) The ionization is highly specific to heavy molecules or atoms with either relatively low ionization potential or having a group with high electron affinity.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
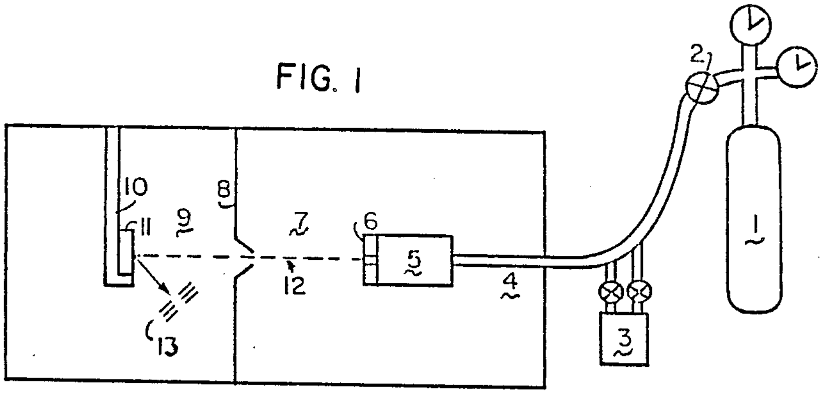
FIG. 1 schematically illustrates one form of apparatus constructed in accordance with the present invention.

With reference first to FIG. 1, there is schematically illustrated one arrangement for producing ions by ionization or dissociative ionization in accordance with the present invention.

As shown in FIG. 1, a light gas (hydrogen or helium), or gas mixture, is supplied from a container 1 via a gas valve 2, which may be manually or remotely controlled to initiate the ion source. The substance to be ionized is supplied from a container 3. The gas from container 1, seeded with the substance to be through 4 first to a heating element 5 and then through a supersonic nozzle 6 disposed within a vacuum chamber 7.

Heating element 5 also serves as a reservoir for non-volatile molecules. Supersonic nozzle 6, which may have continuous or pulsed operation, produces a hyperthermal beam of the gas of container 1 seeded with the substance of container 3 to be ionized.

This hyperthermal supersonic beam, shown at 12 in FIG. 1, is directed through a skimmer and skimmer holder 8 into a high or ultra-high vacuum chamber 9. Disposed within the latter chamber is a holder 10 for a material having a solid surface 11 impinged by the hyperthermal gas beam 12 to induce molecular ionization or dissociative ionization. The ions so produced are extracted by an ions extractor, schematically indicated at 13, which collects and collimates the ion beam for further usage.

Holder 10 for the surface material 11 may include structure for manipulating, cleaning, heating, and electrically biassing the solid substance as desired.

The following is a description of one preferred example for operating the system illustrated in FIG. 1.:

n-propyl iodide molecules were seeded in a hydrogen supersonic beam, accelerated to a high kinetic energy in the range of 1–10 eV. The molecular partial pressure was controlled by the sampling cell temperature (−20°−−70° C. corresponding to 4 torr–0.1 torr). The nozzle was a ceramic boron-nitride 160 μ diameter thin nozzle, with small heated volume to minimize catalytic decomposition. Regular working temperature was 200° C. to minimize thermal dissociation or clusters formation. The beam was skimmed and collimated through two differential pumping chambers and entered into the surface scattering chamber (base pressure $5\times10^{-10}$ torr). The accelerated beam could be either modulated for phase sensitive detection or chopped for kinetic energy measurements. The beam was scattered from a single crystal diamond (111) surface.

The diamond was prepared by acid treatments and heating in vacuum to 900° C. resulting in specular and two first order helium diffraction peaks superimposed on some scattering background. The diamond temperature was in the range of 250°–750° C. A Quadrupole Mass Spectrometer (QMS) (UTI 100 C) with an external homemade ion extractor, served as an ion mass (positive and negative) analyser (electron emitter filament turned off). Care was taken to minimize secondary molecular collision in the QMS ionizer. The surface and its holder could be biased or grounded through a current meter. Total current to ground was measured both from the surface holder and from the ion extractor (to ensure against secondary collision effects).

Figure 2:
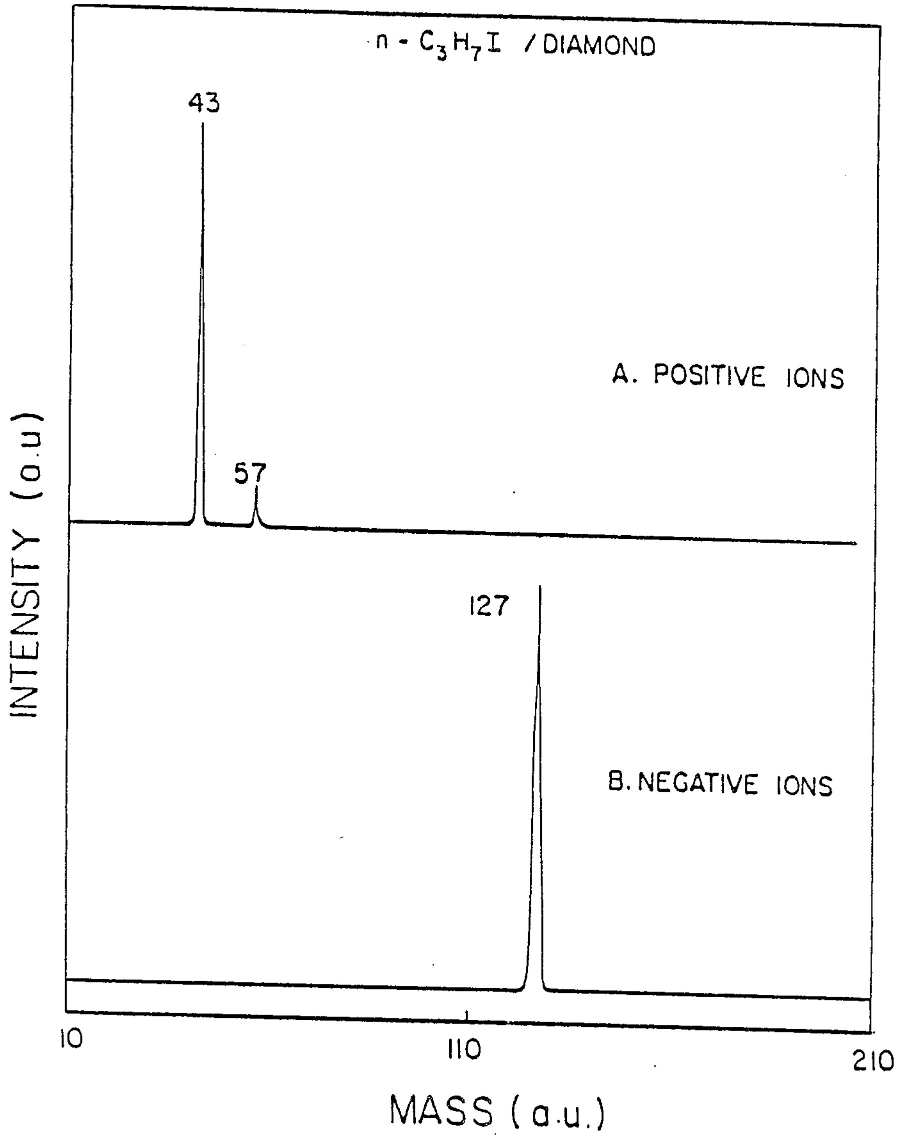
FIG. 2 is a diagram illustrating mass spectra of the positive ions (A) and negative ions (B) produced by ionizing propyl iodide in accordance with the method as described herein.

FIG. 2 is a diagram illustrating the positive ions (A) and negative ions (B) produced according the above-described example, wherein the beam was accelerated to a high kinetic energy of 7 eV, the surface temperature of the diamond was 450° C., the nozzle temperature was 200° C., and the backing pressure was 450 torr, and the surface was biased at ±20 V for the negative and positive ion detection, respectively.

Figure 3:
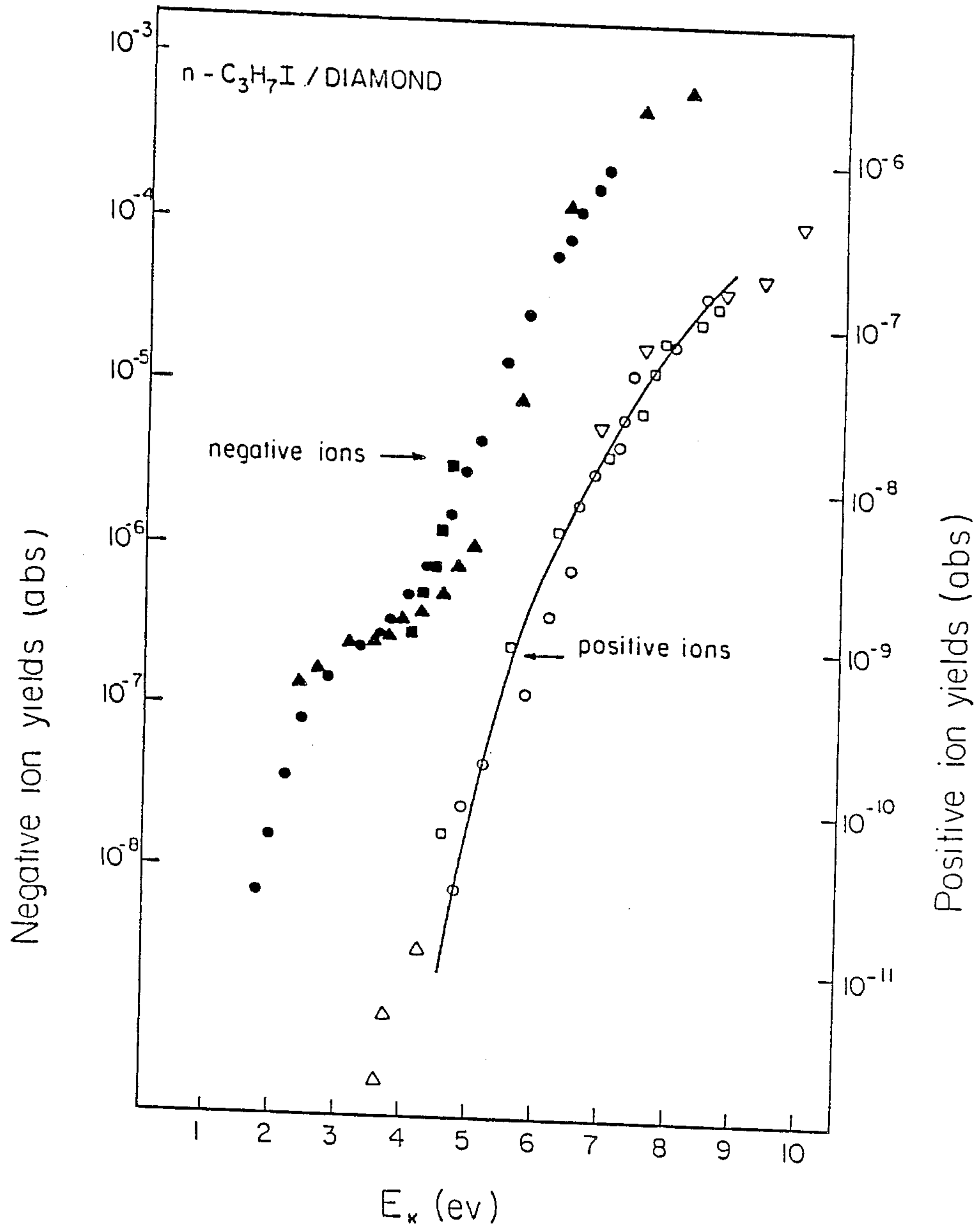
FIG. 3 is a diagram illustrating the kinetic energy detendence of the absolute negative and positive ions yielded in accordance with the described example.

FIG. 3 is a chart illustrating the kinetic energy dependence of the absolute negative and positive ions formation yield. The negative ion yield is of $I^-$; the positive ion yield is of propyl alone (M=43) (no molecular ion). Several measurements are included: open circles (○ ○ ○) are of positive ions detected after pulsed beam (20–30 μsec) scattering; open squares are when the molecular partial vapour pressure is reduced to 0.1 torr; triangles are due to hydrogen pressure controlled kinetic energy; inverted triangles are due to nozzle temperature controlled kinetic energy; solid circles are negative ions due to hydrogen pressure controlled kinetic energy; solid triangles are negative ions with nozzle temperature controlled kinetic energy; and solid squares are negative ions due to helium pressure controlled kinetic energy. The solid line is a fit of the form $$S=5.9\times10^{-11}\,(E_k-3.7\text{ eV})^{6.25}/E_k$$

to the open circles. The absolute yield is calibrated using current to ground measurement through the ion extractor in front of the surface and from the surface mount. In each case, the other (extractor or mount) was biased to saturate the positive or negative ion yield. The molecular beam flux was calibrated using effusive beam and hindered QMS as a total flux detector, both for the effusive and seeded beams. Beam-surface incident angle is 22.5° as in FIG. 1. (The ionization yield is monotonically reduced at higher angles).

As indicated above, the upper trace A in FIG.. 2 shows the positive ions mass spectrum obtained from scattered propyl iodide at 7 eV from the diamond surface; and the lower trace B in FIG. 2 shows the negative ions analysis at the same experimental conditions. In both spectra, the parent ion mass (170) is missing, and mostly $I^-$ or propyl$^+$ are observed manifesting kinetic energy induced surface dissociative ionization.

FIG. 2 contains several other details such as mass 57 of butyl positive ions which is believed to be due to 0.5 percent butyl iodide impurity in the sample which has a higher positive ion yield. A trace amount (0.2 percent) of parent ion peak (M=170) and $(\text{propyl})_2I^+$ (m=213) ions, which we believe are due to clusters of propyl iodide molecules, was also observed (non-linear pressure dependence). Trace amount of $I_2$ (m=254) ions were also observed.

The molecular kinetic energy dependence of the absolute negative and positive ion formation yield is shown in FIG. 3, demonstrating the involvement of the surface in this process. The gas phase threshold value for the dissociative ionization energy is 7.1 eV. It is clearly demonstrated that the experimental threshold is much lower and is different for the positive (about 4 eV) and the negative ions formation where it is lower (about 2eV) (also higher yield).

FIG. 3 also shows that the negative ion yield has a quasi-saturation near the onset energy of the positive ions formation where it starts to rise again. At this preliminary stage, the mechanism seems to involve electronic excitation of the molecule as well as neutralization and chemical processes at the diamond surface.

The set-up illustrated in FIG. 1 has also been used for detecting the presence of a large number of other organic materials. Of particular interest are: the "Freons", because of the need to detect leakages and air pollution; trinitrotoluene (TNT), because of the need to detect explosives; N,N dimethylaniline, because of the need to detect organic-bases, e.g., drugs; and polycyclic aromatic hydrocarbons (PAH) in addition to anthracene, because of the need to detect carcinogenic air pollutants.

Figure 4:
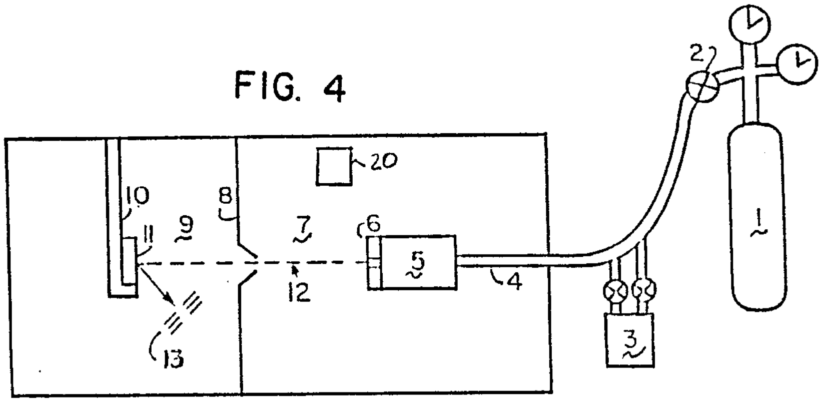
FIGS. 4 and 5 illustrate the apparatus of FIG. 1 but modified to schematically show the generation of the hyperthermal energy by plasma heating of neutral molecules and by laser heating, respectively.

FIG. 4 illustrates the same set-up as in FIG. 1, but modified so as to generate the hyperthermal energy by plasma heating, such as by the use of an electrical gun, magnetic assisted plasma, or the like. In this case, the plasma heating source, indicate at 20 in FIG. 4, is disposed within vacuum chamber 7, but could also be disposed within the high-vacuum chamber 9.

Figure 5:
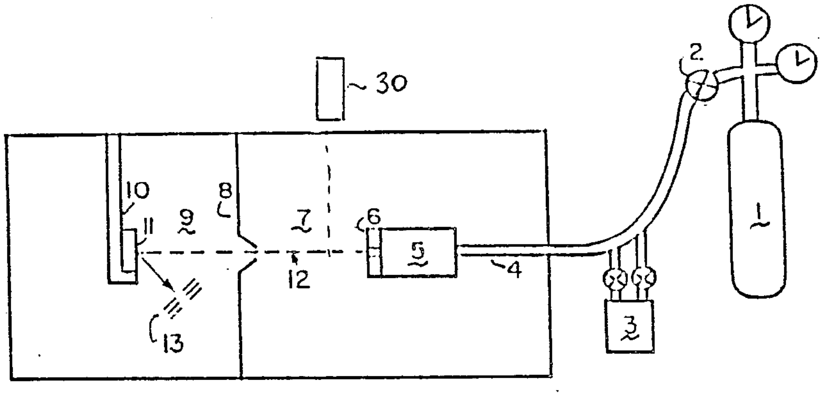

FIG. 5 illustrates a similar set-up as in FIGS. 1 and 4, but using a laser, generally designated 30, for generating the hyperthermal energy. In this case, the laser 30 is disposed outside of the vacuum chamber 7 in alignment with the hyperthermal gas beam 12, it being appreciated that it could also be disposed in alignment with that beam when passing through the high-vacuum chamber 9.

It will also be appreciated that the invention could use a combination of any of the foregoing methods for generating the hyperthermal energy.

While the invention has been described with respect to a preferred embodiment, it will be appreciated that many other variations, modifications and applications of the invention may be made.

What is claimed is:

1. A method of producing ions by surface ionization of a substance, comprising:
   - increasing the molecular energy of the substance to be ionized to the hyperthermal energy range;
   - and directing a beam of said substance to impinge against a solid surface of a material which is capable of inducing ionization of said substance to produce ions, and which does not neutralize the produced ions.

2. The method according to claim 1, wherein said solid surface is disposed in a vacuum chamber when impinged by said beam, and wherein the molecular energy is increased to the hyperthermal range to include kinetic energy gained in aerodynamic acceleration by seeding a light gas with molecules of the substance to be ionized, and thereby to produce a hyperthermal beam of 0.5–20 electron volts of said substance to be ionized.

3. The method according to claim 1, wherein said substance to be ionized is one in which molecular ionization is induced when a beam of the substance is directed to impinge against said solid surface.

4. The method according to claim 1, wherein said substance to be ionized is one in which dissociative ionization is induced when a beam of the substance is directed to impinge against said solid surface.

5. The method according to claim 2, wherein the seeded molecules constitute from 0.1 to 5.0 percent by weight of the contents of the gas.

6. The method according to claim 2, wherein said gas molecules are of hydrogen.

7. The method according to claim 2, wherein said gas molecules are of helium.

8. The method according to claim 1, wherein said substance to be ionized is an organic halide.

9. The method according to claim 1, wherein said substance to be ionized is trinitrotoluene.

10. The method according to claim 1, wherein said substance to be ionized is N,N dimethylaniline.

11. The method according to claim 1, wherein said solid surface is a clean diamond.

12. The method according to claim 1, wherein said solid surface is dirty molybdenum.

13. The method according to claim 1, wherein the increased energy is in the form of electronic and vibrational internal energy produced at least partly by plasma heating.

14. The method according to claim 1, wherein the increased energy is in the form of electronic and vibrational internal energy produced by laser heating.

15. The method according to claim 1, wherein the increased energy is in the form of electronic, vibrational and kinetic energy produced by the combination of aerodynamic acceleration and plasma heating.

16. The method according to claim 1, wherein said surface is heated to enhance the yield.

17. Apparatus for producing ions by surface ionization of a substance, comprising:
   - a solid surface of a material which is capable of inducing ionization of said substance to produce ions and which does not neutralize the produced ions;
   - means for increasing the molecular energy of the substance to be ionized to the hyperthermal energy range;
   - and means for directing a beam of said substance to impinge against said solid surface in said vacuum chamber to thereby produce ions by surface ionization of said substance.

18. The apparatus according to claim 17, wherein said solid surface is within a vacuum chamber, and wherein said means for increasing the molecular energy of the substance to be ionized comprises aerodynamic acceleration means.

19. The apparatus according to claim 17, wherein said substance to be ionized is one in which molecular ionization is induced when a beam of the substance is directed to impinge against said solid surface.

20. The apparatus according to claim 17, wherein said substance to be ionized is one in which dissociative ionization is induced when a beam of the substance is directed to impinge against said solid surface.

21. The apparatus according to claim 17, wherein said means for increasing the molecular energy of the substance to be ionized comprises plasma heating means.

22. The apparatus according to claim 17, wherein said means for increasing the molecular energy of the substance to be ionized comprises laser heating means.

23. The apparatus according to claim 17, wherein said means for increasing the molecular energy of the substance to be ionized comprises the combination of aerodynamic acceleration means and plasma heating means.

24. The apparatus according to claim 17, wherein the molecular energy is kinetic energy gained in aerodynamic acceleration by seeding a light gas with molecules of the substance to be ionized, said apparatus further comprising:

a source of said light gas;

means for seeding said substance into said gas;

means for producing a hyperthermal beam of 0.5–20 electron volts of said gas heated with said substance;

and means for directing said hyperthermal beam to impinge said solid surface when disposed in said vacuum chamber to produce ions by molecular ionization or dissociative ionization.

25. Apparatus for producing ions by surface ionization, comprising:

a source of light gas;

a container for a substance to be ionized;

means for seeding said substance into said gas;

means for producing a hyperthermal beam of 0.5–20 electron volts of said gas heated with said substance;

a vacuum chamber;

a holder in said vacuum chamber for a solid surface of a material which is capable of inducing ionization from said beam to produce ions, and which does not neutralize the produced ions;

and means for directing said hyperthermal beam to impinge said solid surface disposed in said vacuum chamber.

26. The apparatus according to claim 25, wherein said substance to be ionized is one in which molecular ionization is induced when a beam of the substance is directed to impinge against said solid surface.

27. The apparatus according to claim 25, wherein said substance to be ionized is one in which dissociative ionization is induced when a beam of the substance is directed to impinge against said solid surface.

28. The apparatus according to claim 25, further including an ion extractor to collect and collimate the produced ions into a beam.

29. Apparatus according to claim 25, wherein said means for producing said hyperthermal beam comprises a supersonic nozzle in said vacuum chamber.

* * * * *